May 31, 1966     M. R. GOULD ET AL     3,253,930
METHOD OF HEAT TREATING SOYBEANS
Filed Sept. 17, 1962
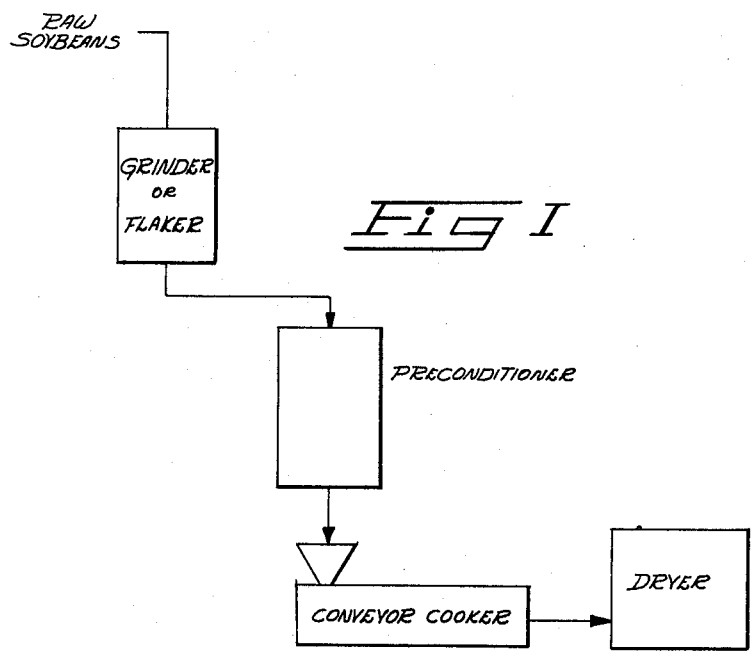
Fig I
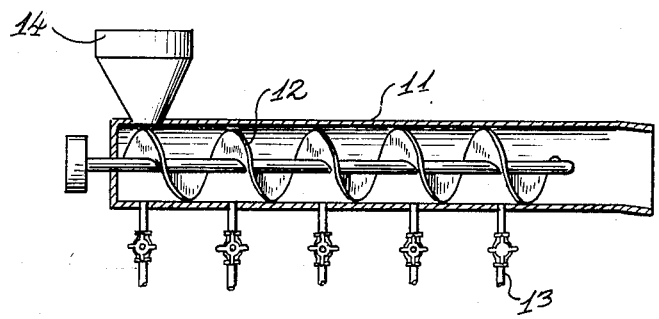
Fig II
Inventors
Max R. Gould
Donald L. Swartz
BY
Olson, Mecklenburger, von Holst,
Pendleton & Neuman Attys

3,253,930
METHOD OF HEAT TREATING SOYBEANS
Max R. Gould and Donald L. Swartz, Barrington, Ill., assignors to The Quaker Oats Company, Chicago, Ill., a corporation of New Jersey
Filed Sept. 17, 1962, Ser. No. 223,958
12 Claims. (Cl. 99—204)

This invention relates to a method of preparing a cooked food of feed product from soybeans.

Raw soybeans have limited nutritional food value but when properly heat processed have high nutritional and energy valve and constitute a food suitable for both humans and animals. According to prior art methods, cooked soybean meals are produced by subjecting soybeans to relatively high temperatures and pressures in the presence of moisture.

When treating soybeans in their natural condition under severe conditions of heat and pressure, the soybean product is very unstable and exhibits a marked tendency to become rancid, possibly due to the effect of the severe heating conditions on the fatty oils present in the soybeans. Because of the value of the fatty oils it has become common practice in the art to extract fatty oils from the soybeans prior to heat treatment either by use of solvents or by pressing the beans under considerable pressures. When the pressing technique is employed it is common to preheat dehulled, flaked soybeans to 240–280° F. prior to the pressing operation. In the press the meal reaches 280–300° F. and is subjected to great pressure over a period of two to three minutes. When solvent extraction is used, the extracted meal is commonly heated to 220–235° F. for 30–45 minutes.

After removal of the fatty oils the treated soybean meal is then heated to relatively high temperatures generally under pressure to cook the product and to thereby modify and generally improve its nutritional characteristics. Extraction or removal of the fatty oil prior to cooking of the soybeans overcomes to a certain extent the rancidity problem, but when a high fat soybean meal is desired it becomes necessary to add back the fatty oil to the cooked soybean meal. As indicated, after extraction or removal of the fatty oils the soybean meal is heat processed under rather severe conditions of temperature and pressure. These conditions require expensive equipment and complicate handling of the material.

It is an object of this invention to provide a method of processing soybeans to prepare a cooked food product utilized in the cooking operation temperatures and pressures lower than those normally employed in prior art methods.

Another object of this invention is to provide a novel method of processing soybeans whereby there is obtained a highly nutritious, high energy, high fat, cooked soybean product of improved flavor having little tendency to become rancid.

A further object of the invention is to provide a method of heat processing soybeans without the necessity of first extracting or removing fatty oils therefrom to produce a cooked, high fat soybean meal having desirable stability characteristics and exhibiting little tendency to rancidity.

It is a still further object of the invention to provide a method of processing soybeans to obtain a cooked soybean product which method is readily adapted to continuous low-cost, high capacity production utilizing readily available relatively inexpensive equipment.

These and other objects of the invention will become apparent as the description of the invention proceeds.

We have now found that cooked soybean products of high nutritional and high energy value can be obtained by subjecting soybeans under controlled conditions to a series of steps which comprises comminuting the beans to a relatively small particle size, adjusting the moisture content thereof to within a prescribed range, heating the comminuted, moistened beans at atmospheric pressure to a temperature not substantially above about 212° F. to cook the soybeans and finally drying the cooked soybean meal to a moisture content which adapts it for use as an animal or human food product. The temperature and pressure conditions employed for heat processing the soybean meal according to this invention are relatively mild as compared with conventional prior art methods.

FIGURE 1 is a diagram showing the various steps of the process.

In accordance with the present invention, raw soybeans are comminuted to a particle size to pass through a U.S. #10 sieve. Other granulations are practical but in general finer grinds reduce the capacity of the grinding apparatus and coarser grinds require longer periods for complete processing of the beans. Preferably the soybeans are comminuted to a particle size so as to pass a U.S. #20 sieve. Comminution of the soybeans can be accomplished by grinding in conventional mills or by flaking with rolls and the like. When flaking is employed the soybeans are flaked to a thickness not substantially greater than about 0.08 inch and a flake thickness of about 0.005 inch is generally preferred. The moisture content of the raw soybeans is not critical and soybeans having natural moisture contents of up to about 15 percent can be comminuted and used in the process without the necessity of predrying.

After comminution to a suitable particle size or flake size the moisture content of the comminuted soybean material is adjusted to a level of from about 15 to 30 percent by weight. This can be done immediately upon entry into the actual cooker but is preferably carried out as a separate preconditioning step in a hydrator or conditioner. Preferably the temperature of the ground material is raised simultaneously with adjustment of its moisture content. Various apparatus having means for wetting and heating the ground material can be advantageously employed to accomplish this preconditioning treatment. Commercially available high speed mixers having means to inject liquid and/or steam or satisfactory for this purpose. In a preferred procedure water is introduced into the conditioner in such amounts as to provide a moisture content in the ground or flaked soybeans of from about 20 to 25 percent. Simultaneously with adjustment of the moisture content, steam is introduced into the preconditioner to raise the temperature of the soybeans to about 170–180° F. The use of steam or other heating means is not absolutely necessary in this step but it is preferred because it facilitates absorption and distribution of the water by the ground or flaked soybeans and also by raising the temperature of the materials lessens the heating requirements in the subsequent cooking step. The period of treatment in the preconditioner is relatively short, generally ranging from about 10 seconds to 60 seconds and preferably from 15 to 20 seconds. The steam which is introduced into the preconditioner is at substantially atmospheric pressure and need not effect cooking of the material but, if desired, partial cooking can be effected in this preconditioning step.

Following the preconditioning step, the ground or flaked soybeans are fed to a cooker which preferably takes the form of a screw conveyor apparatus having means for injecting or sparging live steam into intimate contact with the soybeans. One suitable screw conveyor cooker is illustrated in FIG. 2, commercially available units of this general type being frequently employed in the continuous blanching of fruit, vegetables, mushrooms and so forth. The apparatus shown comprises a tubular conveyor 11 containing a rotatable conveying worm 12. The conveyor is provided with a plurality of inlets 13 for injection of water or steam. There is a hopper 14 for the introduction of the comminuted soybean meal. In use of this apparatus the rate of revolution of the worm is made variable by suitable means not illustrated and is so adjusted that soybeans fed into it will attain the desired temperature and will remain under treatment for sufficient time to bring them into the proper condition. The worm helps to agitate the soybean material and to assist the passage of heat into it so that it may be uniformly heated. In the conveyor cooker the preconditioned soybeans are subjected to the action of steam under substantially atmospheric pressure for a period generally ranging from about 1.5 to 10 minutes, preferably from 2.5 to 3.5 minutes whereby cooking of the soybeans is accomplished. The temperature of the soybeans leaving the conveyor cooker ranges from about 190 to 212° F. Product temperatures appreciably above 212° F. have been found unnecessary to produce a satisfactory soybean food or feed product and are not employed. The moisture content of the soybeans discharging from the conveyor cooker should be in the range of 20 to 35 percent and preferably 25 to 30 percent. Other moisture contents can be employed, but lower moistures prolong the processing time and higher moistures render handling and drying of the product more difficult. The fine comminution of the soybeans permits intimate contact between the sparged steam and the particulate soybeans with the result that the soybeans cook with the use of essentially atmospheric pressure, relatively low cooking temperatures and relatively quickly. As a result of cooking, the urease activity of the soybeans is reduced to practically zero.

The cooked soybean product is dried to a final moisture content of less than about 15 percent (wet basis) and preferably to a moisture content of about 10 percent. Any suitable drying apparatus such as a tray type or rotary type dryer can be employed for this purpose, but preferably a flash type dryer is used that employs the principles of instantaneous drying. The wet cooked soybeans fall into a drying apparatus through which passes a current of hot gas or hot air maintained at a temperature of about 400° F. at the inlet of the collection device. The dryer is constructed in such a way that the product enters the drying duct as near as possible to the centrifugal fan or blower that produces the air current and the total length of the drying duct is such as to provide a drying time of between 0.3 and 2.0 seconds. Such a drying system permits the drying of the wet soybeans in a relatively short period, i.e. a matter of seconds due to the fact that the finely dispersed product is in intimate contact with the hot gases which are at a high temperature as to effect instantaneous evaporation of the water. It is sometimes advantageous to pass the wet soybeans through the fan or blower that produces the hot air current in order to break up any agglomerates that may have formed during the prior steps. The soybean product is dried in a short period, generally ranging from about 1 to 2.5 seconds and the product reaches a temperature of only about 170 to 190° F. At the end of the drying duct a cyclone type separator separates the soybean food product from the hot gas stream.

The final soybean product can be further processed in any desired manner and can be mixed with other food materials by dry blending, pelleting or any other convenient means to prepare a desired food product.

When a dehulled soybean product is desired, the soybeans, before treating as above indicated, can be cracked using conventional Buhr mills or corrugated rolls and the hulls separated from the beans by aspiration or other means all as is well known to the art.

The invention is further illustrated by the following examples:

Example I

Raw soybeans were cracked into about two to four pieces by putting them through smooth cracking rolls spaced so that the beans could not pass the rolls without being cracked. Moisture of this lot of beans was in the range of 6–8% and the urease activity thereof 2+ units. Cracking in this manner permitted the hulls to be freed from the beans and the lightweight hulls were readily separated by aspirating the cracked mixture. The separated hulls comprised approximately 10% of the original weight of the beans.

The dehulled, cracked beans were ground on conventional mill to a particle size passing a 1/16 inch screen. The comminuted beans were subjected to a preconditioning treatment in a commercial continuous mixer employed for preparing animal feeds. The beans were fed into the "preconditioner" at a rate of approximately 700 pounds per hour. Water was added through a spray nozzle at a rate of 0.23 gallon per minute and steam was introduced into the preconditioner at a rate of approximately 200 pounds per hour. The exposure time of the beans to this preconditioning treatment was approximately 15 seconds and the ground beans were discharged from the preconditioner at a temperature of about 177° and contained 24.9% moisture. The urease activity of the preconditioned soybeans was 1.95 units, essentially the same as the raw soybeans. Urease activity is significant inasmuch as the conditions necessary to deactivate the urease are generally sufficient to effect improvement in the utilization of the protein content of the soybeans.

Following the preconditioning treatment, the soybeans were cooked in a screw conveyor into which steam at substantially atmospheric pressure was introduced through a plurality of injection points. Rotation of the worm was set so that the soybeans passed through the unit in approximately two and one-half minutes. Exit temperature of the cooked material was 199° F. and its moisture content 25.2%. The cooked soybeans were then dried to a final moisture content of about 10 percent on a pan dryer consisting of a perforated metal sheet through which heated air was passed. The urease activity of the dried soybean product was zero and the cooked material had an attractive straw color, a good flavor free of "raw bean" flavor, and was granular in nature. Feeding tests conducted with white rats showed that the cooked soybeans exhibited an excellent protein efficiency.

Example II

Soybeans were ground without dehulling to a particle size passing a 1/16 inch screen. The comminuted beans were preconditioned in a small two-section twin screw mixer feeder; the first section of which was used to control the dry feed rate and in the second section water and a small amount of steam were added. The preconditioned material from the twin screw mixer had a moisture content of 24%. After preconditioning the soybeans were cooked in a screw conveyor for three minutes by contact with steam. The cooked product discharging from the cooking conveyor was sent to a flash dryer and through the fan thereof. The temperature of the hot gases at the cyclone exit of the dryer was 400° F. and the soybean product discharging therefrom had a moisture content of 9.5%. Fifteen hundred pounds of soybeans were processed in this manner in three hours. The urease activity of the final product was found to average 0.05 unit and the protein efficiency ratio using a 10% protein ration was found to be 2.91 compared to 1.69 for a sample of the same soybeans untreated.

Example III

A quantity of soybeans was cracked and then flaked to approximately 0.005 inch thickness. No hulls were removed. The flaked soybeans were treated in the same continuous system as outlined. In the preconditioning step the soybeans were heated to a temperature of 175–

185° F. and the moisture content thereof adjusted to 24%. The temperature of the soybeans discharging from the conveyor cooker was 200° F. The urease activity of the final product was found to average 0.06 unit.

*Example IV*

Soybeans were predried to approximately 8% moisture, cracked, aspirated and then flaked. Dehulling reduced the fiber content from 4.5% to 1.8%. The flaked soybeans were then run in the same system as outlined above. However, the moisture content of the beans was lower, averaging 18% from the preconditioner and 21% from the conveyor cooker. Lower moisture levels in the beans during treatment led to a slightly higher but still highly acceptable urease activity of 0.08–0.10 unit compared to 1.99 units for the same beans untreated.

The described invention provides a highly advantageous method for processing soybeans to obtain cooked soybean products suitable for use as food or feed. By the process of the invention high-fat cooked soybean products can be produced having little tendency to rancidity and without the necessity of extracting fatty oils from the beans prior to cooking and subsequently replacing the oils. In the present process cooked soybean meals are prepared without employing excessively high temperatures, pressures, long processing times or excessive moisture which must of necessity be removed from the final product.

Those modifications and equivalents which fall within the spirit of the invention and the scope of the appended claims are to be considered part of the invention.

We claim:

1. A method of treating soybeans which comprises comminuting raw soybeans to a particle size not substantially greater than will pass through a U.S. #10 sieve, contacting said comminuted soybean material with water to adjust the moisture content thereof to a value between about 15 and 30 percent, then heating said soybean material to a temperature of about 190 to 212° F. while maintaining the moisture content thereof between about 20 and 35 percent, and after heating drying the product to a final moisture content of not more than about 15 percent by weight.

2. A method of treating soybeans which comprises flaking raw soybeans to a flake having a thickness not substantially greater than 0.08 inch, contacting said flaked soybean material with water to adjust the moisture content thereof to a value between about 15 and 30 percent, then heating said soybean material to a temperature of about 190 to 212° F. while maintaining the moisture content thereof between about 20 and 35 percent, and after heating drying the product to a final moisture content of not more than about 15 percent by weight.

3. A method of treating soybeans which comprises flaking raw soybeans to a flake having a thickness not substantially greater than 0.005 inch, contacting said flaked soybean material with water to adjust the moisture content thereof to a value between about 15 and 30 percent, then heating said soybean material to a temperature of about 190 to 212° F. while maintaining the moisture content thereof between about 20 and 35 percent, and after heating drying the product to a final moisture content of not more than about 15 percent by weight.

4. A method of treating soybeans which comprises comminuting raw soybeans to a particle size not substantially greater than will pass through a U.S. #10 sieve, heating said comminuted soybean material to a temperature of from 170 to 180° F. and adjusting the moisture content thereof to a value from about 15 to 30 percent, then heating said soybean material to a temperature of from 190 to 212° F. while maintaining the moisture content thereof between about 20 and 35 percent, and after heating drying the product to a final moisture content of not more than about 15 percent by weight.

5. A method of treating soybeans which comprises comminuting raw soybeans to a particle size not substantially greater than will pass through a U.S. #20 sieve, heating said comminuted soybean material to a temperature of from 170 to 180° F. and adjusting the moisture content thereof to a value from about 20 to 25 percent, then heating said soybean material to a temperature of from 190 to 212° F. while maintaining the moisture content thereof between about 25 and 30 percent, and after heating drying the product to a final moisture content of not more than about 15 percent by weight.

6. A method of treating soybeans which comprises flaking raw soybeans to a flake having a thickness not substantially greater than 0.08 inch, heating said flaked soybean material to a temperature of from 170 to 180° F. and adjusting the moisture content thereof to a value from about 15 to 30 percent, then heating said soybean material to a temperature of from 190 to 212° F. while maintaining the moisture content thereof between about 20 and 35 percent, and after heating drying the product to a final moisture content of not more than about 15 percent by weight.

7. A method of treating soybeans which comprises flaking raw soybeans to a flake having a thickness not substantially greater than 0.005 inch, heating said flaked soybean material to a temperature of from 170 to 180° F. and adjusting the moisture content thereof to a value from about 20 to 25 percent, then heating said soybean material to a temperature of from 190 to 212° F. while maintaining the moisture content thereof between about 25 and 30 percent, and after heating drying the product to a final moisture content of not more than about 15 percent by weight.

8. A method of treating soybeans which comprises comminuting raw soybeans to a particle size not substantially greater than will pass a U.S. #10 sieve, heating said comminuted soybean material to a temperature from about 170 to 180° F. and adjusting the moisture content thereof to a value of from about 15 to 30 percent, then contacting said comminuted soybean material with steam at substantially atmospheric pressure under conditions to achieve a moisture content of from 20 to 35 percent and a product temperature of from about 190 to 212° F. for a period of from about 1.5 to 10 minutes, and after heating drying the product to a final moisture content of not more than about 15 percent by weight.

9. A method of treating soybeans which comprises comminuting raw soybeans to a particle size not substantially greater than will pass a U.S. #10 sieve, raising the temperature of said comminuted soybean material to about 170° to 180° F. and adjusting the moisture content thereof to a value of from about 15 to 30 percent, then contacting said comminuted soybean material with steam for a period from about 1.5 to 10 minutes, said contacting being sufficient to achieve a product temperature of 190° to 212° F., and after heating drying the product to a final moisture content of not more than 15 percent by weight.

10. The method of claim 9 wherein prior to treatment the soybeans are dehulled and the hulls separated therefrom.

11. A method of treating soybeans which comprises flaking raw soybeans to a flake having a thickness not substantially greater than 0.08 inch, raising the temperature of said comminuted soybean material to about 170° to 180° F. and adjusting the moisture content thereof to a value of from about 15 to 30 percent, then contacting said comminuted soybean material with steam for a period from about 1.5 to 10 minutes, said contacting being sufficient to achieve a product temperature of 190° to 212° F., and after heating drying the product to a final moisture content of not more than 15 percent by weight.

12. A method of treating soybeans which comprises comminuting raw soybeans to a particle size of not substantially greater than will pass a U.S. #20 sieve, raising the temperature of said comminuted soybean material to about 170° to 180° F. and adjusting the moisture content thereof to a value of from about 20 to 25 percent, then contacting said comminuted soybean material with steam for a period from about 1.5 to 10 minutes, said contacting being sufficient to achieve a product temperature of 190° to 212° F., and after heating drying the product to a final moisture content of not more than 15 percent by weight.

References Cited by the Examiner

UNITED STATES PATENTS

| | | | |
|---|---|---|---|
| 531,013 | 12/1894 | Watson | 99—98 |
| 1,813,268 | 7/1931 | Bachler | 99—98 |
| 1,859,279 | 5/1932 | Chamberlain | 99—204 |
| 2,267,747 | 12/1941 | Plews | 99—98 |
| 3,141,777 | 7/1964 | Guidarelli et al. | 99—98 |

OTHER REFERENCES

Markley: Soybeans and Soybean Products, vol. 2 (pp. 906–908), Interscience Publishers, Inc., 1951.

A. LOUIS MONACELL, *Primary Examiner.*

BEATRICE H. STRIZAK, *Examiner.*

S. J. BAICKER, *Assistant Examiner.*